Figure 1:
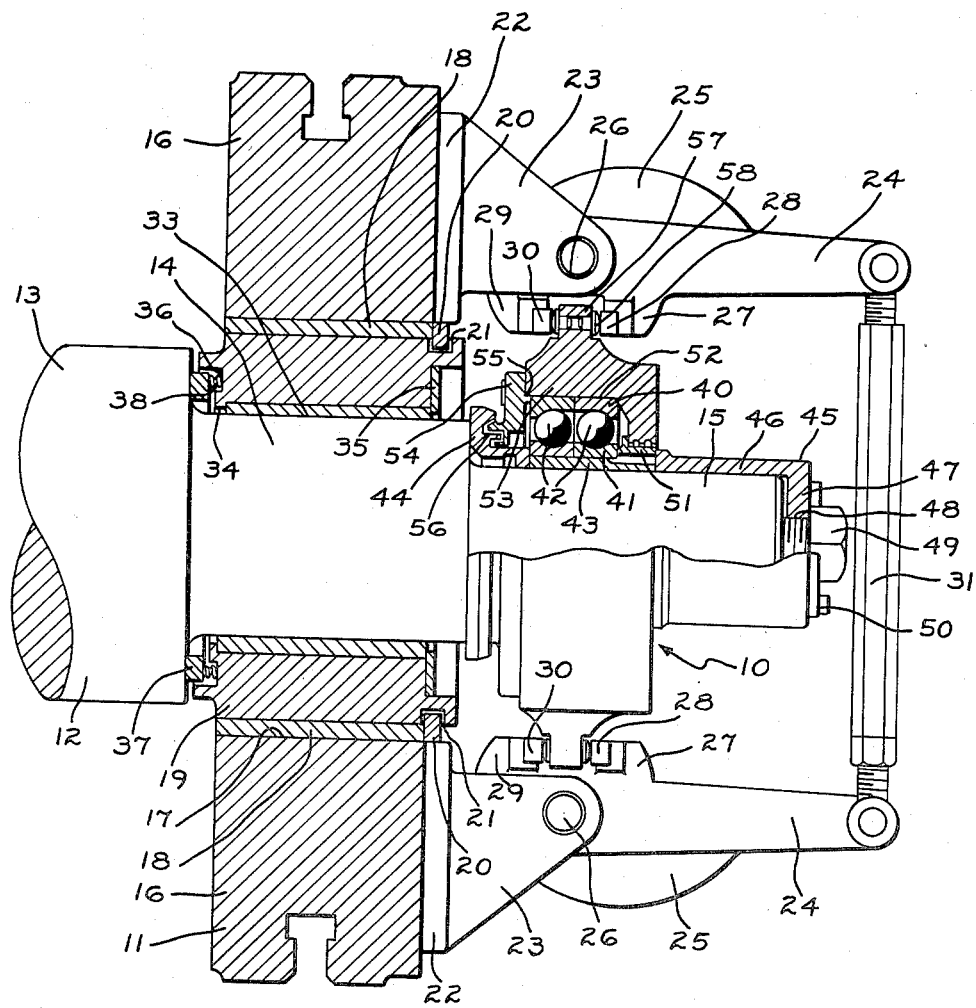

Feb. 14, 1956 J. M. O'MALLEY 2,734,406
BEARING ASSEMBLY FOR ROLLING MILL
Filed Sept. 19, 1952 2 Sheets-Sheet 2

INVENTOR.
JOSEPH M. O'MALLEY
BY
Norman S. Blodgett
ATTORNEY

United States Patent Office

2,734,406
Patented Feb. 14, 1956

2,734,406

BEARING ASSEMBLY FOR ROLLING MILL

Joseph M. O'Malley, Worcester, Mass., assignor to Morgan Construction Company, Worcester, Mass., a corporation of Massachusetts Application September 19, 1952, Serial No. 310,472

5 Claims. (Cl. 80—55)

This invention relates generally to bearing assemblies for rolling mills and more particularly to a rolling mill bearing of the type using a phenolic resin radial bearing surface and an anti-friction bearing thrust bearing surface.

For many years, workers in the rolling mill art have sought a bearing construction which would permit the use of a moulded plastic radial bearing and a roller or ball bearing to take endwise thrust, yet which would not interfere with the removal of the roll and bearing assembly from the mill housing in a direction axially of the roll. Such a construction would be useful, for instance, in a mill having a closed top housing, the roll being removable by using a crane having a socket which would fit over one end of the roll, so that the roll would be supported in cantilever fashion during removal. Previously known constructions of this type were very complicated and expensive and attempts to move them with the socket-type crane resulted in damage to the roll wabbler. Furthermore, the prior art assemblies were not capable of being disassembled quickly for changing rolls; this is a considerable handicap in rolling mill operation where it is very important to keep the down time to a minimum. The above-recited disabilities of the prior art are obviated by the present invention.

It is therefore an outstanding object of the present invention to provide a novel bearing assembly using a radial bearing formed of molded plastic material and having an anti-friction thrust bearing.

It is another object of this invention to provide a bearing assembly which may be removed from the mill with the roll by a socket-type crane without damage to bearing or roll.

A further object of the invention is the provision of a bearing construction making use of a resin-type radial bearing and an anti-friction thrust bearing, wherein the bearing assembly may be easily and quickly disconnected from the mill housing.

Another object of the invention is to provide an outboard thrust bearing construction which will not interfere with the normal operation of the mill and which is easily and quickly moved for axial adjustment of the roll.

It is a still further object of this invention to provide an outboard thrust bearing construction which permits axial removal of the roll from the housing without damage to the roll wabbler.

Figure 2:
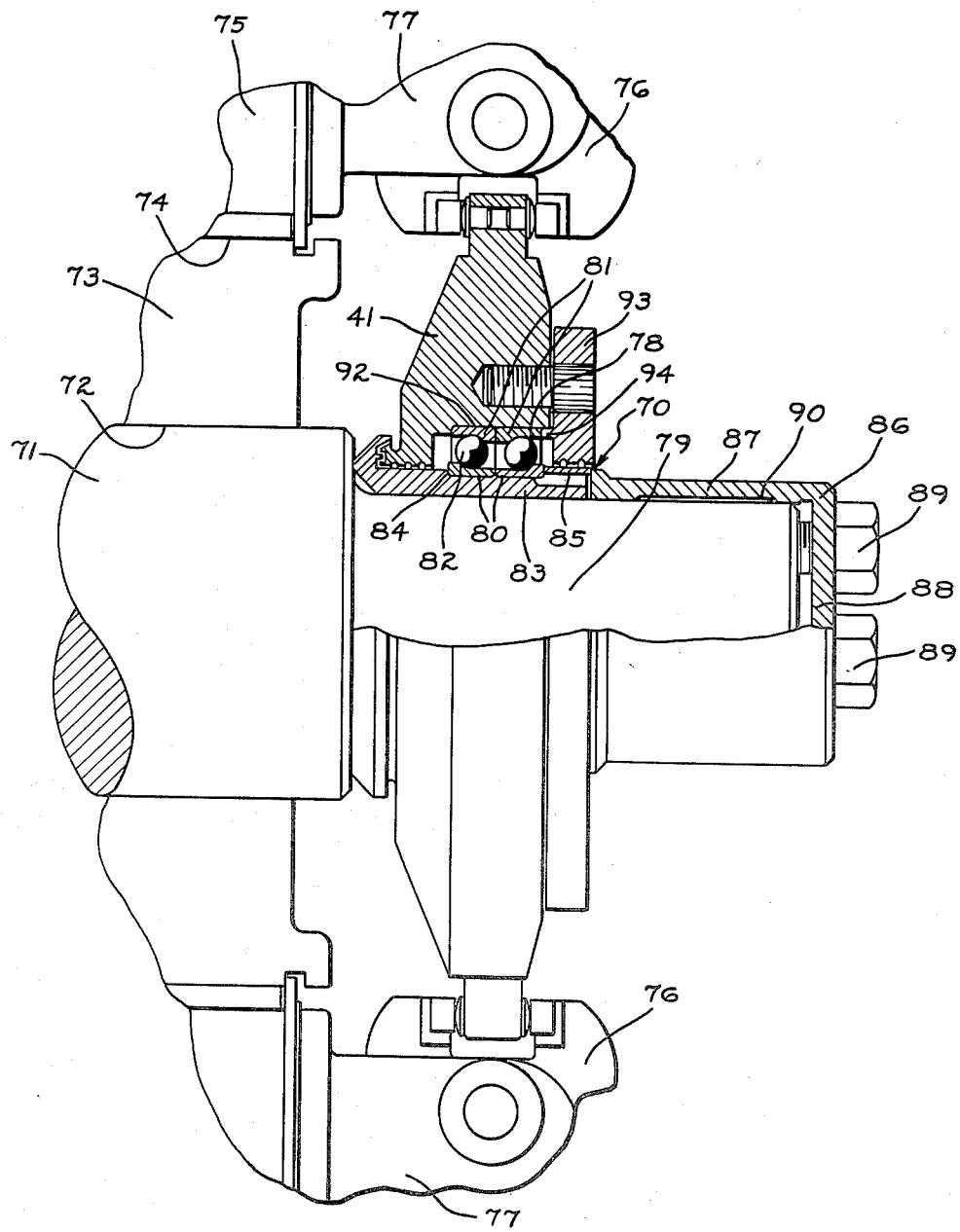

Although the novel features which are characteristic of this invention will be particularly pointed out in the claims appended hereto, the invention itself, as to its objects and advantages, the mode of its operation and the manner of its organization will be better understood by referring to the following description taken in connection with the accompanying drawings forming a part thereof, in which:

Figure 1 is a plan view of the invention as it appears in a section taken horizontally of a mill housing just above the roll axis, and Figure 2 is a view similar to that of Figure 1 of a modification of the invention.

Referring to Figure 1, the bearing assembly, indicated generally by the reference numeral 10, is shown in use in conjunction with a mill housing 11 and a roll 12. The roll is formed with a cylindrical working surface 13, a reduced cylindrical neck portion 14, and a further reduced portion 15 at the extreme end. The mill housing has two upright pillars 16 defining a window 17, which window is provided with liners 18. Between these liners is mounted a bearing chock 19 which is capable of vertical movement within the window. The chock is locked axially by vertical guides 20 which are mounted at the outer corner of the window 17 and which reside in grooves 21 provided therefore in the outer surface of the chock. On the outer surface of each of the housing pillars is fastened a bracket 22 having an ear 23 which extends outwardly parallel to the axis of the roll. To each of these ears 23 is pivoted a lever arm 24 and a lever arm 25, the pivoting being about a vertical axis defined by a hinge pin 26. The lever arm 24 is provided with a nose 27 having a hard metal insert 28 which provides a flat face directed toward the housing; the lever arm 25 is provided with a nose 29 having a hard metal insert 30 which has a flat face directed away from the housing. The outer ends of the lever arms 24 are joined by a turnbuckle 31 and a similar turnbuckle is provided for the outer ends of the lever arms 25, although it cannot be seen in the drawing.

A bore 32 passes through the chock 19 for receiving the neck 14 of the mill roll. This bore is provided with a bearing lining 33 formed of phenolic resin or any of several materials used for such service. A slight shoulder 34 on the wall of the bore prevents axial movement of the lining 33 on the inner side of the housing, while a lock nut 35 retains the lining on the outer side. The chock 19 is provided with an annular recess 36 on the inner side thereof and adjacent the end of the working surface 13 of the roll. An annular sealing ring 37 is situated between the chock and the end of the working surface of the roll and is resiliently urged against the latter by springs 38 residing in the recess 36. Surrounding the reduced portion 15 of the roll 12 is a ball bearing 39 of the type designed to receive axial rather than radial forces; this bearing is arranged to receive axial thrust on the roll in either direction. The bearing 39 consists of an outer member such as race 40, an inner member such as race 41 and the usual balls 42. The inner race is supported on a sleeve 43 which is mounted on the reduced portion of the roll. Between the sleeve 43 and the radial surface which forms the transition between the roll neck 14 and the reduced portion 15 of the roll resides an annular sealing member 44. At the other end, the sleeve 43 is prevented from moving axially outwardly by a cap member 45. The cap member 45 consists of a tubular portion 46 and an end wall 47. The inside diameter of the tubular section is such that the cap slides easily on the reduced portion of the roll and the size of the parts is such that the end wall 47 resides adjacent the outer end of the roll. The end of the roll is provided with a large central threaded bore and the end wall 47 of the cap member has a circular aperture 48. A large bolt 49 passes through the aperture 48 and is threaded into the bore in the end of the roll. Smaller bolts 50 pass through the end wall 47 and are threaded into the end of the roll, thus preventing relative rotative movement between the cap member and the roll. Tightening the bolt 49 forces the sleeve 43 and the sealing member 44 tightly against the end of the roll neck 14 and secures them against rotative or axial movement relative to the roll. The inner race 41 of the bearing is prevented from moving axially inwardly on the outer surface of the sleeve by the fact that the sealing member 44 is somewhat thicker than the sleeve and, thus, presents a shoulder against which the inner race resides. An annular spacer 51 surrounds and is keyed to the sleeve 43 and engages the inner race at one end and the tubular portion of the cap member at the other end. The cap member 45, therefore, serves to lock the inner race of the bearing and its associated parts against axial or rotative movement relative to the roll. The outer race 40 of the bearing resides in a bore 52 in a housing 53 and is held therein by a closure member 54. The closure member has a small shoulder 55 which extends into the bore 52 and contacts the outer race of the bearing; tightening up on bolts which fasten the closure member to the housing 53 results in securely locking the race against axial or rotative movement relative to the housing 53. The closure member 54 and the sealing member 44 are provided with interlocking projections 56 which seal the inner side of the bearing. The housing 53 is provided with a radial flange 57 and in this flange are mounted studs 58 which extend axially from the flange and have rounded heads. The hardened metal inserts 28 and 30 on the lever arms 24 and 25, respectively, contact these rounded heads, whereupon actuation of the turnbuckles connected to the outer ends of the lever arms causes the flange 57 to be tightly clamped. The outboard portion of the housing 53 is positioned adjacent the outer surface of the spacer 51 and sealing means extend therebetween for sealing the outer side of the bearing. The tubular portion 46 of the cap member is of such a thickness, however, that the housing 53 is not engaged thereby.

The operation of the apparatus will be evident from the above description. The ball bearing is secured to the roll by the cap member 45 and the associated elements. Axial adjustment of the roll is accomplished by slackening off one of the turnbuckles and tightening the other, the rounded heads of the studs 58 permitting such action without binding. Removal of the roll with the entire bearing assembly retained thereon is accomplished by removing the restraint of the lever arms 24 and 25 and the turnbuckles. After the guide 20 is loosened, a socket-type crane is attached to the roll by placing the socket over the cap member 45 and removing the roll and bearing assembly out of the mill housing axially.

In Figure 2 is shown another embodiment of the invention, the view being somewhat enlarged over that of Figure 1 and omitting some elements of the apparatus for the purpose of clarity. The apparatus of the invention, designated by the reference character 70, is shown in use in conjunction with a roll 71 held in the bore 72 in a chock 73 which is, in turn, held in a window 74 of a mill housing 75. As in the previously-described embodiment, clamps 76 are provided mounted in brackets 77 fastened to the mill housing. A ball thrust bearing 78 surrounds a reduced portion 79 of the roll, the bearing consisting of inner races 80, outer races 81 and balls 82. The inner races are mounted on the outer surface of a sleeve-like mounting member 83, which, in turn, is slidably mounted on the reduced portion of the roll. The member 83 is provided with a slight shoulder 84 against which the inner races 80 are normally pressed. A spacer 85 is slidably mounted on the mounting member outwardly of the inner races in a position to engage the outer radial end of the inner race. A cap member 86 having a tubular portion 87 and an end wall 88 is mounted on the end of the roll, the tubular portion being slidably fitted to the surface of the reduced portion of the roll and the end wall residing adjacent the end of the roll. A plurality of large bolts 89 pass through the end wall of the cap member and are threadedly attached to the end of the roll. The inner surface of the cap member is provided with a relief groove 90 and the inner end of the tubular portion normally engages the outer end of the spacer 70 and the outer end of the mounting member 83. A tightening of the bolts 89 forces the cap member inwardly along the reduced portion of the roll and clamps the mounting member between the cap member and the end of the roll neck. At the same time, the inner races and the spacer are clamped between the cap member and the shoulder 84. A thick, disk-like thrust bearing housing 91 surrounds the mounting member 83 and extends radially outwardly therefrom. A counterbore 92 enters the outboard side of the housing 91 and in this counterbore resides the outer races 81 of the bearing. An annular closure member 93 is bolted to the outboard face of the housing 91 and is provided with a small shoulder 94 which extends into the counterbore 92 and engages the outboard end of the outer races. Tightening the bolts which attach the closure member to the housing causes the outer races to be clamped between the shoulder 94 and the inner end of the counterbore 92. The closure member 93 closely surrounds the spacer 85 and sealing means is interposed therebetween, this being the outer seal for the thrust bearing enclosure. The housing 91 and the mounting member 83 reside in a closely-spaced relationship and suitable seals are provided between them, this constituting the inward seal of the thrust bearing enclosure. The operation of this species of the invention is almost exactly the same as that of the embodiment shown in Figure 1 and described hereinbefore.

While certain noval features of the invention have been shown and described and are pointed out in the annexed claims, it must be understood that various omissions, substitutions, and changes in the forms and details of the device illustrated and in its operation may be made by those skilled in the art without departing from the essence of the invention.

The invention having thus been described, what is claimed as new and desired to secure by Letters Patent is:

1. A bearing assembly for use on a rolling mill having a housing, comprising a horizontal roll, a plain radial bearing in which the roll is supported mounted in the housing, an anti-friction thrust bearing having inner and outer races, the anti-friction thrust bearing normally surrounding a reduced portion of the roll exterior of the housing, a bearing housing surrounding the anti-friction thrust bearing and fixed to the outer race thereof, means for holding the bearing housing in a selected position relative to the mill housing, a cap member enveloping the outboard end of the roll and having an elongated tubular portion coextensive with the outer part of the reduced portion of the roll, means for fastening the cap member to the end of the roll, the said fastening means serving to force the cap member along the roll to clamp the inner race of the bearing against movement relative to the roll, the outer surface of the cap member being formed to permit engagement by a socket-type crane for removal of the roll and bearing assembly, a sleeve-like mounting member which overlies a part of the reduced portion of the roll and on which the inner race of the anti-friction thrust bearing is mounted, the bearing housing and the mounting member having adjacent surfaces which are in proximity on one side of the bearing and having sealing means interposed therebetween.

2. A bearing assembly for use on a rolling mill having a housing, comprising a horizontal roll, a plain radial bearing in which the roll is supported mounted in the housing, an anti-friction thrust bearing having inner and outer races, the anti-friction thrust bearing normally surrounding a reduced portion of the roll exterior of the housing, a bearing housing surrounding the anti-friction thrust bearing and fixed to the outer race thereof, means for holding the bearing housing in a selected position relative to the mill housing, a cap member enveloping the outboard end of the roll and having an elongated tubular portion coextensive with the outer part of the reduced portion of the roll, means for fastening the cap member to the end of the roll, the said fastening means serving to force the cap member along the roll to clamp the inner race of the bearing against movement relative to the roll, the outer surface of the cap member being formed to permit engagement by a socket-type crane for removal of the roll and bearing assembly, the outer race being fixed in an axial counterbore in the bearing housing, a closure member which covers the open end of the counterbore and serves to clamp the outer race therein, and a sleeve-like mounting member supported on the reduced portion of the roll and on which the inner race of the anti-friction thrust bearing is mounted, portions of the closure member and the mounting member being in close proximity on one side of the bearing and having sealing means permitting relative movement therebetween without leakage of lubricant.

3. A bearing assembly for use on a rolling mill having a housing, comprising a horizontal roll, a plain radial bearing in which the roll is supported mounted in the housing, an anti-friction thrust bearing having inner and outer races, the anti-friction thrust bearing normally surrounding a reduced portion of the roll exterior of the housing, a bearing housing surrounding the anti-friction thrust bearing and fixed to the outer race thereof, means for holding the bearing housing in a selected position relative to the mill housing, a cap member enveloping the outboard end of the roll and having an elongated tubular portion coextensive with the outer part of the reduced portion of the roll, means for fastening the cap member to the end of the roll, said fastening means serving to force the cap member along the roll to clamp the inner race of the bearing against movement relative to the roll, the outer surface of the cap member being formed to permit engagement by a socket-type crane for removal of the roll and bearing assembly, a sleeve-like mounting member which overlies a part of the reduced portion of the roll and on which the inner race of the anti-friction thrust bearing is mounted, the bearing housing and the mounting member having adjacent surfaces which are in proximity and on one side of the bearing and having sealing means interposed therebetween, the outer race of the anti-friction thrust bearing being fixed in an axial counterbore in the bearing housing, a closure member which covers the open end of the counterbore and serves to clamp the outer race therein, portions of the closure member and the mounting member being in close proximity and having sealing means interposed therebetween.

4. A bearing assembly for use on a rolling mill having a housing, comprising a horizontal roll, a main bearing in which the roll is supported mounted in the housing, a thrust bearing having inner and outer members, the thrust bearing normally surrounding a reduced portion of the roll exterior of the housing, a bearing housing surrounding the thrust bearing and fixed to the outer member thereof, means for holding the bearing housing in a selected position relative to the mill housing, a cap member enveloping the outboard end of the roll and having an elongated tubular portion coextensive with the outer part of the reduced portion of the roll, means for fastening the cap member to the end of the roll, the said fastening means serving to force the cap member along the roll to clamp the inner member of the bearing against movement relative to the roll, the outer surface of the cap member being formed to permit engagement by a socket-type crane for removal of the roll and bearing assembly, a sleeve-like mounting member which overlies a part of the reduced portion of the roll and on which the inner member of the thrust bearing is mounted, the bearing housing and the mounting member having adjacent surfaces which are in proximity on one side of the bearing and having sealing means interposed therebetween.

5. A bearing assembly for use on a rolling mill having a housing, comprising a horizontal roll, a main bearing in which the roll is supported mounted in the housing, a thrust bearing having inner and outer members, the thrust bearing normally surrounding a reduced portion of the roll exterior of the housing, a bearing housing having flanges extending therefrom, said housing surrounding the thrust bearing and being fixed to the outer member thereof, means for holding the bearing housing in a selected position relative to the mill housing, said means consisting of clamps hingedly attached to the mill housing and turnbuckles connecting clamps on opposite sides of the bearing housing to cause the clamps to grasp the flanges on the bearing housing, a cap member enveloping the outboard end of the roll and having an elongated tubular portion coextensive with the outer part of the reduced portion of the roll, means for fastening the cap member to the end of the roll, the said fastening means serving to force the cap member along the roll to clamp the inner member of the bearing against movement relative to the roll, the outer surface of the cap member being formed to permit engagement by a socket-type crane for removal of the roll and bearing assembly, a sleeve-like mounting member which overlies a part of the reduced portion of the roll and on which the inner member of the thrust bearing is mounted, the bearing housing and the mounting member having adjacent surfaces which are in proximity on one side of the bearing and having sealing means interposed therebetween.

References Cited in the file of this patent

UNITED STATES PATENTS

| 1,586,150 | Hein | May 25, 1926 |
| 1,792,618 | Van Derhoef | Feb. 17, 1931 |
| 1,820,017 | Foulks | Aug. 25, 1931 |
| 1,893,836 | Baninger | Jan. 10, 1933 |
| 2,182,994 | Palmgren | Dec. 12, 1939 |
| 2,243,010 | Iversen | May 20, 1941 |

FOREIGN PATENTS

| 603,870 | Germany | Oct. 10, 1934 |